(12) United States Patent
Groeneveld

(10) Patent No.: US 9,385,613 B2
(45) Date of Patent: Jul. 5, 2016

(54) METHOD OF OPERATING SWITCH MODE POWER CONVERTERS, AND CONTROLLERS AND LIGHTING SYSTEMS USING SUCH A METHOD

(71) Applicant: NXP B.V., Eindhoven (NL)

(72) Inventor: Wouter Groeneveld, Elst (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/168,210

(22) Filed: Jan. 30, 2014

(65) Prior Publication Data

US 2014/0225532 A1    Aug. 14, 2014

(30) Foreign Application Priority Data

Feb. 12, 2013  (EP) ................................. 13154892

(51) Int. Cl.
*G05F 1/00*    (2006.01)
*H05B 37/02*   (2006.01)
(Continued)

(52) U.S. Cl.
CPC ....... *H02M 3/33507* (2013.01); *H05B 33/0815* (2013.01); *H05B 33/0818* (2013.01); *H05B 37/02* (2013.01); *G09G 3/3406* (2013.01); *H05B 33/0848* (2013.01); *H05B 41/2828* (2013.01); *H05B 41/3927* (2013.01); *Y02B 20/346* (2013.01); *Y10S 362/80* (2013.01)

(58) Field of Classification Search
CPC ........... H05B 33/0815; H05B 33/0818; H05B 33/0848; H05B 37/02; H05B 41/2828; H05B 41/3927; H05B 41/36; Y10S 362/80; G09G 3/3406; G09G 2320/064; G09G 2330/021; H02M 3/156; H02M 3/33507

USPC ...... 315/307, 291, 224, 209 R, 308, 312, 247
See application file for complete search history.

(56) References Cited

U.S. PATENT DOCUMENTS 8,289,732 B2    10/2012 Li et al.
2007/0024213 A1*  2/2007 Shteynberg et al. .......... 315/291
(Continued)

FOREIGN PATENT DOCUMENTS

CN    102265233       11/2011
JP    10-256488        9/1998
TW    201037974 A1    10/2010

OTHER PUBLICATIONS

Extended European Search Report for EP Patent Appln. No. 13154892.7 (Jul. 2, 2013).

*Primary Examiner* — Alexander H Taningco
*Assistant Examiner* — Christian L Garcia

(57) ABSTRACT

A controller and method for operating a controller are disclosed. In an embodiment, a method involves in a mode-setting phase, polling connection pins to sense the presence and/or magnitude of a respective relatively high impedance connected between a respective connection pin and a predetermined electrical potential, and/or other connection pins to sense the presence and/or magnitude of a respective further impedance connected between the respective connection pin and a predetermined electrical potential. The method also involves selecting an operational mode from a plurality of possible operational modes. In an operational phase, the method involves operating in the selected operational mode, including providing a respective drive signal having a relatively low output impedance from each of the first group of connection pins, and measuring a sense voltage on each of the second group of connection pins.

11 Claims, 3 Drawing Sheets

(51) Int. Cl.
*H05B 39/04* (2006.01)
*H05B 41/36* (2006.01)
*H02M 3/335* (2006.01)
*H05B 33/08* (2006.01)
*H05B 41/282* (2006.01)
*G09G 3/34* (2006.01)
*H05B 41/392* (2006.01)

(56) References Cited

U.S. PATENT DOCUMENTS

2010/0157636 A1\* 6/2010 Li et al. .................. 363/124
2010/0259279 A1 10/2010 Shearon et al.
2011/0032024 A1 2/2011 Chen et al.

\* cited by examiner

METHOD OF OPERATING SWITCH MODE POWER CONVERTERS, AND CONTROLLERS AND LIGHTING SYSTEMS USING SUCH A METHOD

CROSS-REFERENCE TO RELATED APPLICATIONS

This application claims the priority under 35 U.S.C. §119 of European patent application no. 13154892.7, filed on Feb. 12, 2013, the contents of which are incorporated by reference herein.

FIELD OF THE INVENTION

The present invention relates to methods of operating switch mode power converters. It further relates to controllers therefor and to systems using such controllers.

BACKGROUND OF THE INVENTION

Switch mode power converters can be used in a wide variety of applications. The mode of operation of a switch mode power converter typically depends on the type of application. Even within the same type of application, the operation note of a switch mode power converter may depend on the specific application.

Taking as an example switch mode power converters used as LED lighting drivers, requirements on such LED lighting drivers, especially those for retrofit LED lamps, also known as solid state lighting (SSL), differ according to region and according to lamp supplier. For instance, the character of the lamp impedance to the mains, often measured through power factor (PF) and total harmonic distortion (THD) is tied to requirements which differ by region, by market (e.g. consumer markets and professional markets) and by lamp power range.

Further, preferences of SSL lamp suppliers result in different requirements on the driver. A minimum physical size will result in a driver operating at a high switching frequency to minimize inductive components, while a focus on maximum power conversion efficiency will result in a lower switching frequency, offering lower losses at the cost of a somewhat larger physical volume.

Moreover, dimmable SSL drivers for retrofit use are generally required to detect presence of a wall dimmer, to ensure operation as intended and to interpret the phase angle of the output signal of the dimmer as a dimming level to be applied to the lamp light output. Lamp suppliers as well as standardization bodies recommend several so-called "dim curves", which define the relation between detected dimming angle and light output. Dim curves can either be optimized for best user experience, best compatibility to a certain dimmer range, or for lowest power dissipation.

The operation modes described above can all be integrated in an SSL driver at very limited additional cost, especially in case digital circuitry is used. However, in common with drivers for switch mode converters intended for other types of applications, the continuous drive to reduce system cost and size has resulted in SSL drivers with just 6 or 8 connection pins which cover the minimum connections required. As a result, no pins are available to provide input to the driver, regarding the desired operational mode. Typically, then, in consequence multiple products are designed and manufactured, specific to individual operational modes, based on a single design base. This may result in a high, and thus expensive, inventory, and relative inflexibility of supply of the driver ICs.

SUMMARY OF THE INVENTION

According to a first aspect of those provided a method of operating a controller for a switch mode power converter and having connection pins, the method comprising an mode-setting phase and an operational phase and comprising: in the mode-setting phase: polling at least one of (a) each of a first predetermined group of the connection pins to sense at least one of the presence and the magnitude of a respective relatively high impedance connected between the respective connection pin and a predetermined electrical potential, and (b) each of a second predetermined group of the connection pins to sense at least one of the presence and the magnitude of a respective further impedance connected between the respective connection pin and a respective further electrical potential, and selecting an operational mode from a plurality of possible operational modes, in response to the presence and/or magnitude of the respective one or more relatively high impedances and the respective further impedances; and in the operational phase: operating in the selected operational mode, comprising providing a respective drive signal having a relatively low output impedance from each of the first group of connection pins; and measuring a sense voltage on each of the second group of connection pins.

Thus, according to this aspect, a few relatively low-cost components such as resistors may be detected, and by operating the controller in an mode-setting phase, intended mode detection may be simply and cheaply enacted without any requirement for additional or dedicated connection pins. The or each of the relatively low impedances may be lower than the or each of the relatively high impedances. However, the skilled person will appreciate that in embodiments, the or each of the relatively low impedances may be at least one two, three, or even four or more orders of magnitude lower than the or each of the relatively high impedances. The or each respective further potential may be predetermined. Without limitation, the or each further potential may be fixed or may correspond to the potential across a current sensing resistor.

In embodiments, the mode-setting phase comprises polling both (a) each of the first predetermined group of connection pins and (b) each of the second predetermined group of connection pins. By using both groups of connection pins, it may be possible to select between a wider range of operational modes. In embodiments the predetermined electrical potential is a local ground potential. The or each predetermined electrical potential to which each of the first group of connections pins may be connected by a respective relative high impedance may be the same electrical potential, and in particular may be a local ground potential. A local ground potential is a particularly convenient potential against which to measure voltages.

In embodiments, during the mode-setting phase the polling is repeated one or more times, and the magnitudes of the respective high impedances and respective further impedances are calculated from one of the group comprising an average, median, and mode of the respective sensed magnitudes. By repeating the measurement and determining or calculating at least one of an average, median or modal value of the magnitude of the impedances, it may be possible to reduce or eliminate the effects of unwanted interference such as voltage spikes, which might otherwise result in anomalous determination of the intended mode, potentially leading to inappropriate mode setting. For some types of application, such as lighting circuits, this could be damaging; for others, such as safety-critical applications, it could also be dangerous.

In embodiments, polling comprises supplying a current from a current generator to the respective connection pin, sensing a voltage between the pin and the respective predetermined or further electrical potential, and digitising the magnitude of the respective impedances by means of an analog-to-digital converter. Polling may further comprise sensing the voltage between the pin and the respective predetermined or further electrical potential in the absence of a current from the current generator, and subtracting this value in order to eliminate offsets attributable to for instance ground differences or the analog-to-digital converter. Embodiments may further comprise using a look-up table to select the operational mode from a plurality of possible operational modes.

According to another aspect there is provided a controller for a switch mode power converter, the controller having a first group of one of more connections pins configured to, in operational modes, each provide a respective drive signal having a relatively low output impedance, and a second group of one or more connection pins configured to, in operational modes, measure a respective sense voltage, the controller comprising a mode-setting circuit, the mode-setting circuit being configured to: poll at least one of (a) each of the first group of one or more connection pins to sense at least one of the presence and the magnitude of a respective relatively high impedance connected between the respective connection pin and a predetermined electrical potential, and (b) each of the second group of one or more connection pins to sense at least one of the presence and/or the magnitude of a respective further impedance connected between the respective connection pin and a predetermined electrical potential; and select an operational mode from a plurality of possible operational modes, in response to the presence and magnitude of the respective one or more relatively high impedances and the respective further impedances.

The predetermined electrical potential may be a local ground potential. The controller may further comprise an averaging circuit configured to calculate one of the group comprising the average, median, and mode of repeated respective sensed magnitudes. The mode setting circuit may comprise a current source for being sequentially switchably connected to each of the first group and second group of connection pins, and an analog-to-digital converter for digitising the voltage across the relatively high impedance and the further impedances. In other embodiments the mode setting circuit comprises a plurality of current sources for being switchably connected, at the same time, to each of the first group and second group of connection pins, and a plurality of analog-to-digital converters for digitising the voltage across the relatively high impedance and the further impedances.

The controller may further comprise a lookup table for selecting the operational mode from a plurality of possible operational modes, in response to the magnitude of the respective one or more relatively high impedances and the respective further impedances.

According to another aspect there is provided a LED lighting system comprising a controller as described above.

These and other aspects will be apparent from, and elucidated with reference to, the embodiments described hereinafter.

BRIEF DESCRIPTION OF DRAWINGS

Embodiments will be described, by way of example only, with reference to the drawings, in which.

Figure 1:
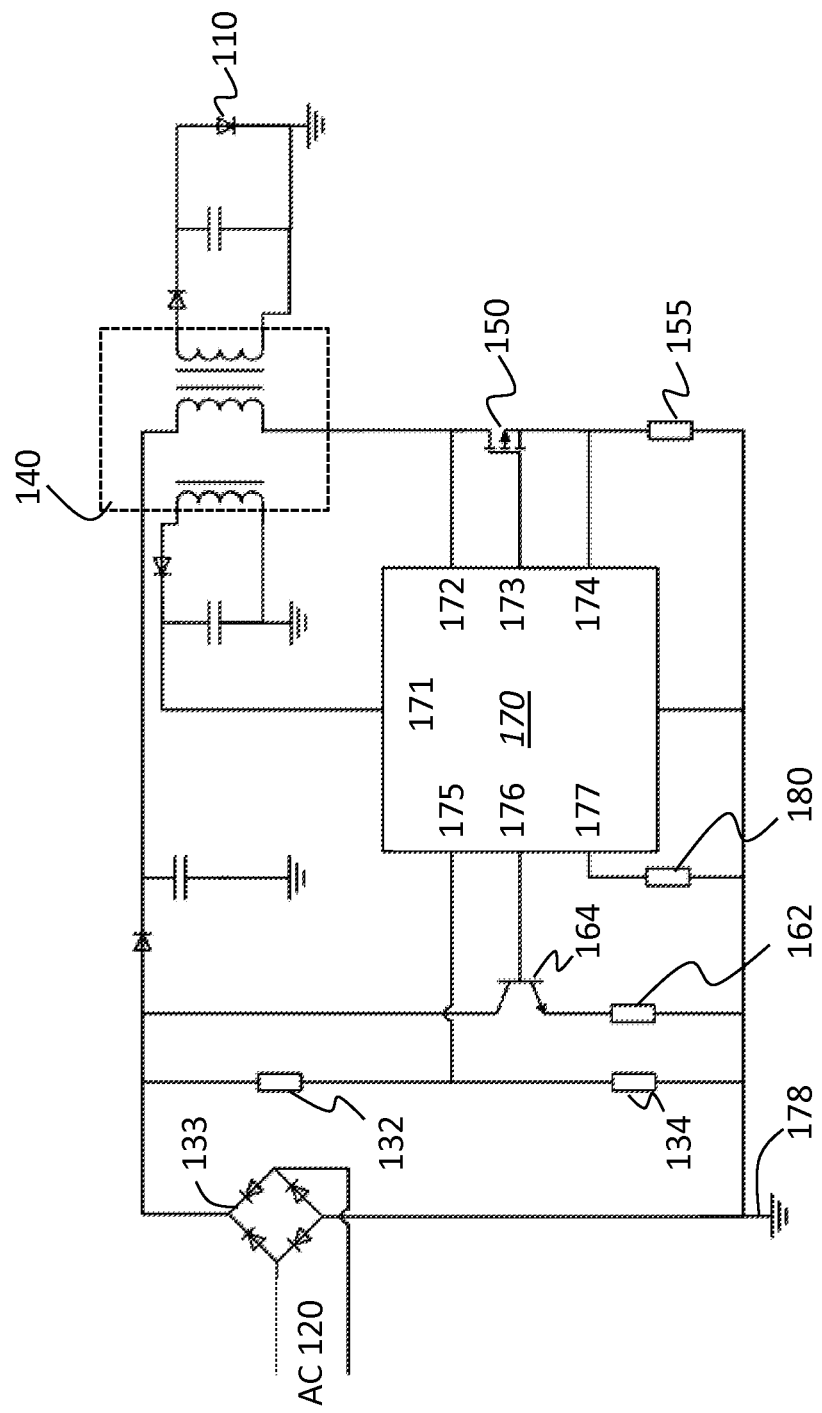
FIG. 1 illustrates a typical application for a switch mode power converter.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 illustrates a typical application for a switch mode power converter. The application shown is for driving an LED lighting circuit, comprising LEDs 110 which are powered by an AC mains supply 120, the phase of which may have been cut by a phase-cut dimmer, and which is rectified by rectifier 133. The switch mode power converter comprises a transformer 140 together with switch 150. A controller 170 controls the switch mode power converter and in particular drives the switching of switch 150. The current through the switch is monitored by means of low impedance resistor R_sense 155. The rectified mains voltage is monitored by means of resistor pair 132 and 134. In order to ensure proper operation of the phase-cut dimmer, if present, a bleeder circuit is provided comprising resistor 162 and transistor 164. A supply voltage VCC is derived from an auxiliary winding of the transformer 140 and supplied to the driver 170.

The driver 170 is a conventional eight pin driver, and as can be seen, all 8 pins are in use. Pins which are common for most SMPS circuits are Gate_drive 173, to drive the external switch, Cur_sense 174 to detect the current flowing through the switch and transformer, VCC 171 supplied from the auxiliary winding, and ground (GND) 178.

In the specific example shown of a LED driver operable with dimmable LEDs, the remaining pins are typically used as follows: an HV/Sense pin 172 is used both as a startup energy source and as a detection pin for primary and secondary current profiles. An NTC pin 177, is used for connection to a temperature sensor 180 enables detection and regulation of the temperature inside the lamp, which may be required to ensure LED lifetime. For dimming purposes, a Mains_sense pin 175 is used to detect the shape of the incoming AC mains in order to interpret the setting of a wall dimmer. Finally, a Bleed_drive pin 176 controls an active component which enables loading the dimmer with more current than taken by the MOSFET part of the circuit, in order to keep the dimmer fully functional.

Of course variations on this schematic are possible, such other types of active components (Bipolar instead of MOSFETs), as well as other ways to detect the mains shape and the signals at the transformer. However, a common factor is the absence of, or limitation on, the number of pins available to determine the operational mode of the driver.

Figure 2:
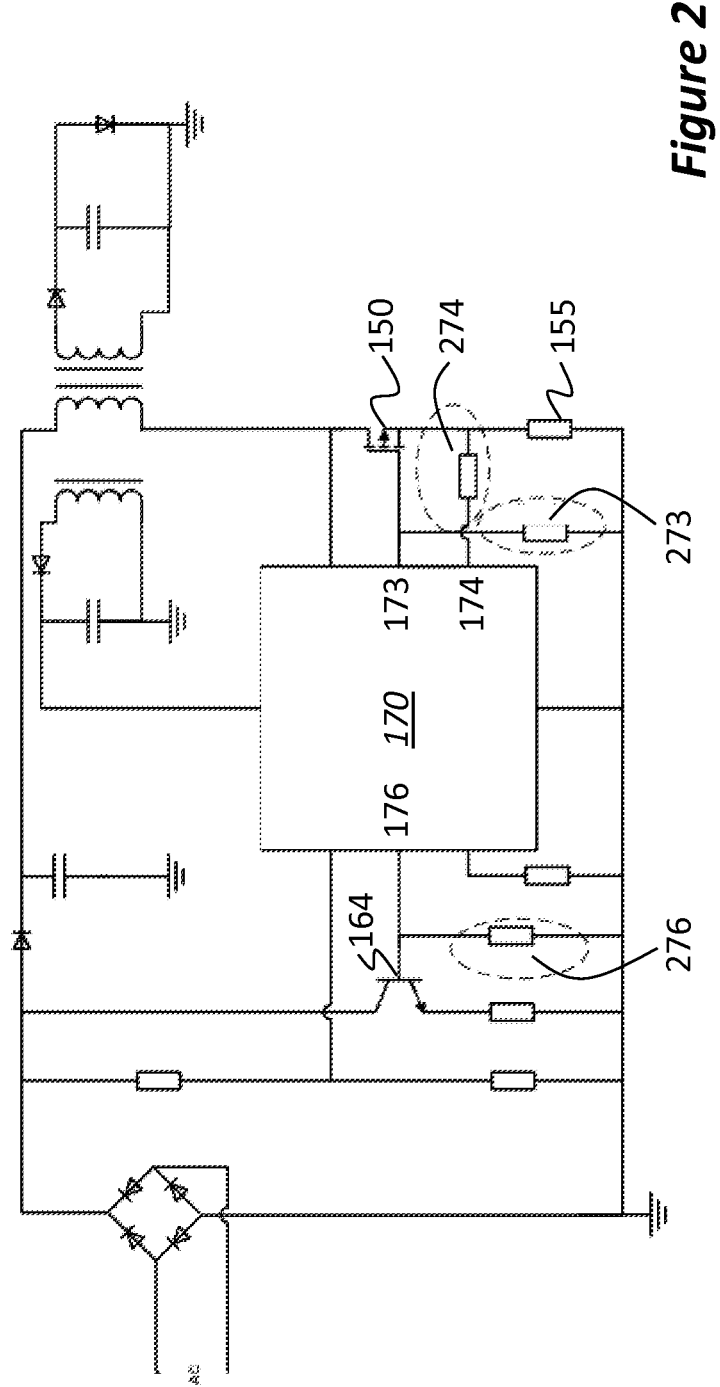
FIG. 2 illustrates a typical application, specifically a dimmable LED lighting application, for a switch mode power converter according to embodiments.

FIG. 2 illustrates a typical application, specifically a dimmable LED lighting application, for a switch mode power converter, according to embodiments. The arrangement is generally similar to that shown in FIG. 1, however in this arrangement three additional impedances, in this case resistors, are included:

Firstly, connected between the Gate_drive pin 173 and ground is a first resistor 273. Secondly, connected between the Bleed_drive pin 176 and ground is a second resistor 276. And thirdly, connected between the current sense pin Cur_sense 174 and the source of the FET 150 (and thus the low impedance Cur_sense resistor 155), is a third resistor 274.

In embodiments, a combination of such impedances may be used by the driver, in a mode-setting phase, in order to determine the intended operational mode of the driver. As will be discussed in more detail below, the location and type of impedances are chosen in order not to interrupt or disturb, to any significant effect, the normal operation of the driver when in normal operation mode. The mode-setting phase may be an initial phase. In such embodiments, the mode-setting phase may occur whenever the driver is powered up, as will be discussed in more detail hereinbelow, and the results of the mode-setting phase used to determine the operational mode of the driver, which is fixed thereafter. In other embodiments, subsequent operation may be interrupted so as to check the presence and/or magnitude of the respective one or more relatively high impedances and respective further impedances; if, as a result, it is determined that the driver should operate in a different operational mode than that in which it is operating, it may be possible be change the operation, to the newly-determined operational mode. For such embodiments, it is necessary that the control circuit be able to change the value of at least one of the mode-setting impedances "on-the-fly" such as for instance by shorting a part of it using a switch or FET. In yet other embodiments, it may not be necessary to interrupt subsequent operation, but rather the mode-setting phase may be carried out during normal operation, provided that, at some part of parts of the operating cycle, each of the first and second predetermined group of pins are not required for use in the operation, for a sufficient time such that the pin may be properly polled. The skilled person will appreciate that either the duration or occasion of the non-use time may be different for different pins. In such embodiments, then, the mode-setting phase may overlap, or interleave, with the operational phase: it should be noted that the two phases thus need not be entirely distinct.

Consider first the resistors connected between ground and the driver pins, Gate_drive 173 and the Bleed_drive 176 respectively. In normal operation phase, these resistors add some additional load to the drivers of the pins, resulting in slightly larger driver circuits, and thus in a loss of power. In consequence, to minimise this loss, the value of these resistors should be chosen to be relatively high ohmic. Use of sufficiently high ohmic resistors will result in negligible loss. Although the precise limit lower limit of resistance which would be acceptable depends on the any specific application, in general a resistance value above approximately 1 kΩ may be acceptable.

In an initial phase, a current is provided to the pin. Provided the voltage at the pin (173 or 176) is sufficiently low, the respective switch (150 or 164) will not be turned on, and the voltage on the pin can then be measured in order to determine the value of the resistor (273 or 276 respectively).

Next consider the resistor 274 connected to the current sense pin 174. As the R_sense resistor 155 is low-ohmic (typically approximately 1 ohm) and the Cur_sense pin can have a high input impedance (it is for voltage sensing only), resistor 274 can have a wide range of values. Normal operation will not be affected provided that a resistance Rmod_cs of resistor 274 and the pin input capacitance do not introduce too much delay. Typically, resistance values greater than 100Ω may be usable. In the initial start-up phase, the total resistance between pin 174 and ground is dominated by the resistance of the resistor 274, and so similar to the method described above with respect to resistors 273 and 276, a current is sourced to the pin 174, and the resulting voltage on the pin used to determine the magnitude of the resistance Rmod_cs of resistor 274.

In the embodiment shown in FIG. 2, resistors have been introduced, associated with two types of connection pins for the driver, that is to say pins used for providing a drive current to a switch transistor, and pins used for sensing a sense voltage. In other embodiments, resistors or impedances may be associated with only one of these types of connection pins. That is to say, in embodiments it may be sufficient to provide resistances associated just with pins, such as 173 or 176, which are associated with providing drive current to switches. In other embodiments, it may be sufficient to provide resistances associated just with pins, such as 174, which are associated with sensing voltages. It will be appreciated, though, that by providing resistances associated with both types of pin, more information may be passed to the driver IC, which may thus be designed to allow operation in a wider range of operational mode.

The resistors which are used to determine the operational mode, for example the resistors 273, 274, and 276 in FIG. 2, may collectively be termed as mode definition resistors. In embodiments, the magnitude of the mode definition resistors are not taken into consideration; rather only their presence or absence is considered. In an example such as that shown in FIG. 2 in which any combination of three resistors may, or may not, be present, there are thus $2^3$, that is to say 8, combinations, or states, which are available. Thus, by a suitable selection of resistors, the circuit designer can provide information to the driver IC to operate in any one of eight different operation modes or states.

In other embodiments the magnitude of the mode definition resistors are taken into consideration. Depending on design factors, such as but not limited to the accuracy of the analog-to-digital converter and current source, it may be possible to distinguish between two or more distinct magnitudes of a resistor. As an example only, consider an embodiment in which it is possible to distinguish between two values of, or the complete absence of, the resistor associated with each drive pin such as 173 or 176 (resulting in, for each pin, three possibilities: that is to say, the first value, the second value, and absence), and only one value of, or the absence of, the resistor associated with a voltage sense pin such as 174 (resulting in just two possibilities: that is to say, the presence or absence). The number of different combinations for a circuit such as that shown in FIG. 2 would then be $3^2 \times 2^1$, that is to say, any one of 18 different operation modes may be set.

Figure 3:
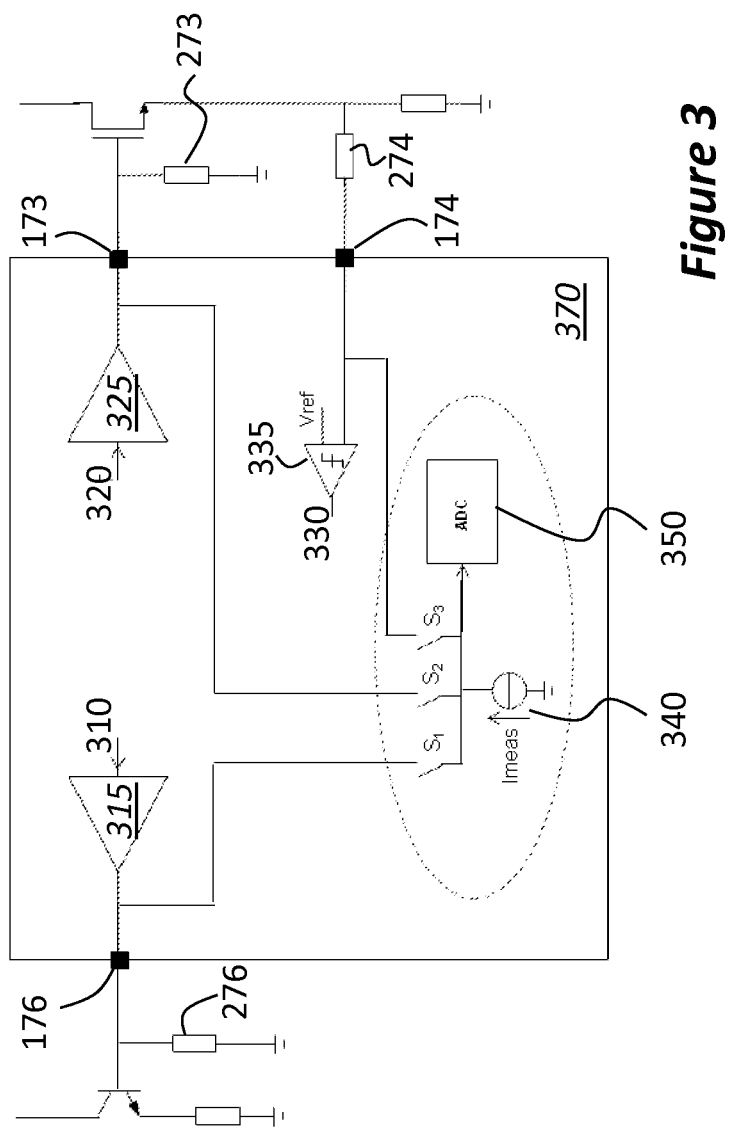
FIG. 3, shows schematically parts of a driver, and associated components, configured and operable according to embodiments.

Turning now to FIG. 3, this shows schematically parts of a driver 370, and associated components, configured to operates a method that has just described. For ease of understanding, only three connection pins of the driver has been have been shown, that is to say the switch gates drive in Gate_drive 173, the bleeder drive pin Bleed_drive 176 current sense pin Cur_sense 174. The associated resistors 273, 274, and 276, as discussed above with reference to FIG. 2, are also shown. Conventional functions of the driver circuit, such as the bleeder driver on/off control signal 310 driving the bleeder driver 315, the switch on-off control signal 320 driving the driver 325, and the peak detection signal 330 output from a comparator 335 are shown, connected to the appropriate connection pin.

As shown in the figure, the connection pins 173, 174, and 176 are also switchably connected, by means of switches S1, S2 and S3 respectively, to a current source Imeas, 340. The voltage at the switches is sensed, and digitised by means of analog-to-digital converter 350.

It will be appreciated that, in preferred embodiments, a constant current source Imeas is used and the voltage is sensed, since it is generally more convenient to provide a current source than a voltage source. However, in other, less preferred embodiments, a voltage source is used and the current is measured in order to determine the value of the resistors 273, 274, and 276.

Mode-setting will generally be performed during start-up of the driver: at start-up of the driver integrated circuit 370, which startup is typically initiated by a rising supply level, a state machine first enters an initial phase or configuration mode, in which the values of the mode definition resistors are detected.

Detection can be done by means of a measurement current $I_{meas}$, which is routed sequentially to each of the pins at which a mode resistor can be connected. The routing is enabled by the switches S1, S2 and S3 in this example. The circuits which are connected to the pins for normal operation are kept off. For example, relevant buffers such as 315, 325, may set to high-impedance outputs, peak detector comparator may be switched off or its output left unused).

Once the voltage at a pin has settled, the on-chip analog-to-digital converter 350 measures the voltage level, after which the value of the external resistor can be calculated. In other embodiments, differing measurement currents $I_{meas}$ may be routed to different pins. For example, a lower current may be routed to a pin to which a higher value impedance might have been connected, and then a lower value current routed to a pin on which a lower value impedance is expected, In this way, the voltage levels detected on the pins may be more nearly equal.

It will be appreciated that the required accuracy of the measuring current is not high, since the mode resistors to be applied may be specified to be predetermined values—or, in embodiments, only the existence of the resistor need to be determined. Further, if the resistance of one resistor is known to a high level of accuracy, this information may be used to determine, with increased accuracy, the resistance of any other resistors.

As has already been noted, the voltage levels created during the detection phase at the drive pins have to be below the levels at which the external MOSFET or bipolar transistor will start operating. However, this leaves sufficient voltage space for several resistor values.

After all required detections are completed, the internal state machine proceeds to start up the IC 370 up to normal SMPS operation, with the detected settings which could define for example switching frequency, current profile over the mains phase, dimming settings etc. The relation between the detected mode resistor values and the mode of operation will typically be detected via a look-up table or similar in a digital circuit.

Figure 4:
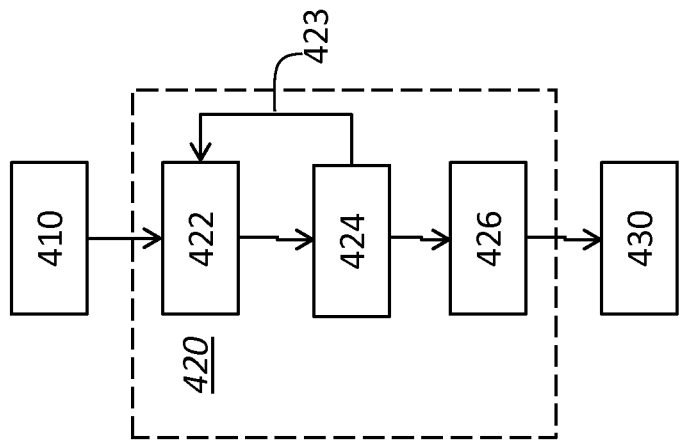
FIG. 4, is a flowchart of a method according to the disclosed embodiments.

A flowchart of a method according to embodiments is shown in FIG. 4, with reference to FIG. 3 as an example. At start-up 410, the state machine enters a configuration mode 420. In configuration mode 420, the state machine closes, at 422, one of the switches S1, S2, or S3 (say, for example, S1). At 424 the voltage at the respective pin 176, 173, or 174 (in the example, this is 176) is determined by means of analog-to-digital converter 350. The flow then loops back, as shown at 423 in FIG. 4 and the next switch (for example S2) is then closed, to determine the voltage on pin 173, and so on. Once the voltage at each of the respective pins has been determined, the state machine exits the loop 422, 423, 424, and determines at 426, which operational mode should be set, by means of consulting a lookup table. The state machine then exits the mode setting initial phase 420, and proceeds at 430 to start up the controller 370 normal operation mode, according to the operational mode determined by the initial phase 420.

It will be appreciated, that in embodiments in which it is only necessary to distinguish only between two possibilities (typically the presence or absence of a mode setting impedance), the analog-to-digital converter may consist simply of a comparator, together with a single flip-flop logic circuit arranged to record the result of the comparison.

In other embodiments in which the controller includes more than one current source 340 and analog-to-digital converter 350, the switches, which connect the pins to separate current sources, may be closed in parallel at step 422 and the voltages at the pins are measured in parallel during step 424. Loop 423 may then not be required.

In preferred embodiments, the state machine operates to undertake the mode setting, initial phase, each time the controller 370 is started up. In other embodiments the initial phase may be entered only upon a first start-up of the controller 370, in which case it may be appropriate to store the results of the mode setting initial phase in the controller 370, for instance by programming a value in EEPROM. When the controller 370 is subsequently started up, the mode setting, initial phase may then be bypassed. However, as will be appreciated by the skilled person, this may result in a significantly increased cost of the controller 370, and thus will be generally less preferred.

The above embodiments have utilised resistors. It will be appreciated that other impedances, including a capacitive or reactive element, may be used in place of pure resistances in some embodiments, although the skilled person will appreciate that use of resistors is particularly convenient.

From reading the present disclosure, other variations and modifications will be apparent to the skilled person. Such variations and modifications may involve equivalent and other features which are already known in the art of switch mode power converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of operating a controller for a switch mode power converter and having connection pins, the method comprising a mode-setting phase and an operational phase and comprising:
    in the mode-setting phase:
        (i) polling at least one of (a) each connection pin of a first predetermined group of the connection pins to sense at least one of the presence and the magnitude of a respective relatively high impedance connected between the respective connection pin and a predetermined electrical potential, and (b) each connection pin of a second predetermined group of the connection pins to sense at least one of the presence and the magnitude of a respective further impedance connected between the respective connection pin and a respective further electrical potential, and
        (ii) selecting an operational mode from a plurality of possible operational modes, in response to the presence and/or magnitude of the respective one or more relatively high impedances and the respective further impedances;
    and in the operational phase:
    operating in the selected operational mode, comprising
        (a) providing a respective drive signal having a relatively low output impedance from each connection pin of the first group of connection pins; and
        (b) measuring a sense voltage on each connection pin of the second group of connection pins;
            wherein the mode-setting phase comprises polling both (a) each connection pin of the first predetermined group of connection pins and (b) each connection pin of the second predetermined group of connection pins.

2. The method of claim 1, wherein the predetermined electrical potential is a local ground potential.

3. The method of claim 1, wherein in the mode-setting phase the polling is repeated one or more times, and the magnitudes of the respective high impedances and respective further impedances are calculated from one of the group comprising an average, median, and mode of the respective sensed magnitudes.

4. The method of claim 1, wherein polling comprises supplying a current from a current generator to the respective connection pin, sensing a voltage between the pin and the predetermined electrical potential, and digitising the magnitude of the respective impedances by means of an analog-to-digital converter.

5. The method of claim 4, comprising using a look-up table to select the operational mode from a plurality of possible operational modes.

6. The method of claim 1, wherein the mode setting phase at least one of overlaps with or interleaves with the operational phase.

7. A controller for a switch mode power converter, the controller having a first group of one or more connections pins configured to, in operational modes, each provide a respective drive signal having a relatively low output impedance, and a second group of one or more connection pins configured to, in operational modes, measure a respective sense voltage, the controller comprising a mode-setting circuit,
    the mode-setting circuit being configured to:
    poll at least one of each connection pin of the first group of one or more connection pins to sense at least one of the presence and the magnitude of a respective relatively high impedance connected between the respective connection pin and a predetermined electrical potential, and each connection pin of the second group of one or more connection pins to sense at least one of the presence and the magnitude of a respective further impedance connected between the respective connection pin and a predetermined electrical potential; and
    select an operational mode from a plurality of possible operational modes, in response to the presence and/or magnitude of the respective one or more relatively high impedances and the respective further impedances;
    wherein the mode setting circuit comprises a current source for being sequentially switchably connected to each of the first group and second group of connection pins, and an analog-to-digital converter for digitising the voltage across the relatively high impedance and the further impedances.

8. A controller as claimed in claim 7, wherein the predetermined electrical potential is a local ground potential.

9. A controller as claimed in claim 7, further configured to calculate one of the group comprising the average, median, and mode of repeated respective sensed magnitudes.

10. A controller as claimed in claim 7, further comprising a lookup table for selecting the operational mode from a plurality of possible operational modes, in response to the magnitude of the respective one or more relatively high impedances and the respective further impedances.

11. An LED lighting system comprising a controller as claimed in claim 7.

* * * * *